May 12, 1970  V. E. HAMILTON  3,511,560

AMBIENT LIGHT FILTER

Filed Oct. 15, 1962  4 Sheets-Sheet 1

INVENTOR
VERN E. HAMILTON

Edwin Coates
-ATTORNEY-

INVENTOR
VERN E. HAMILTON
By Edwin Coates
ATTORNEY

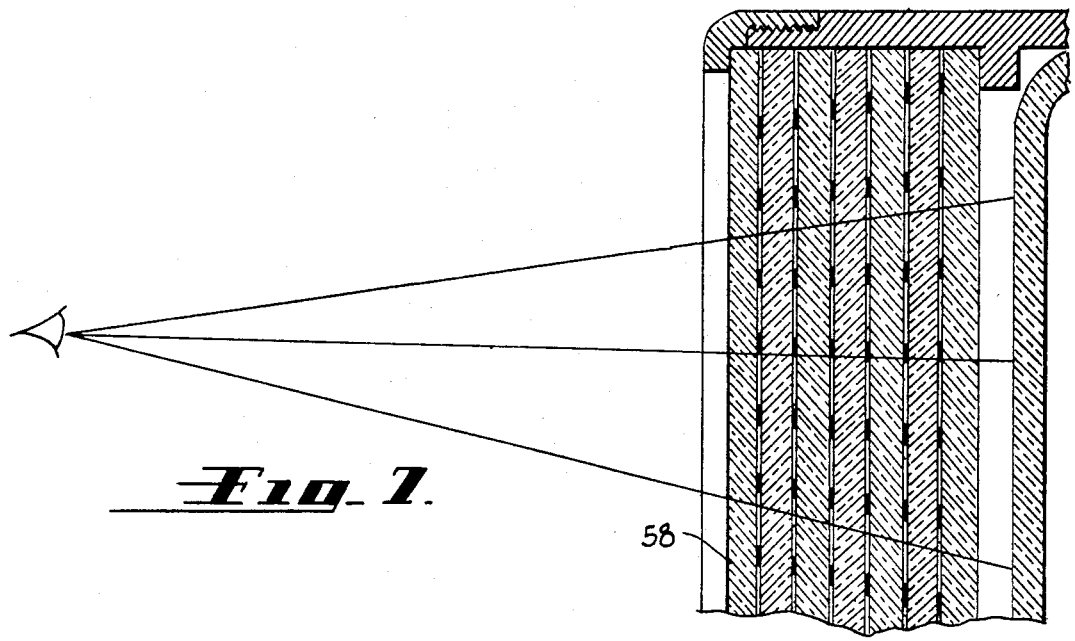
Fig. 7.
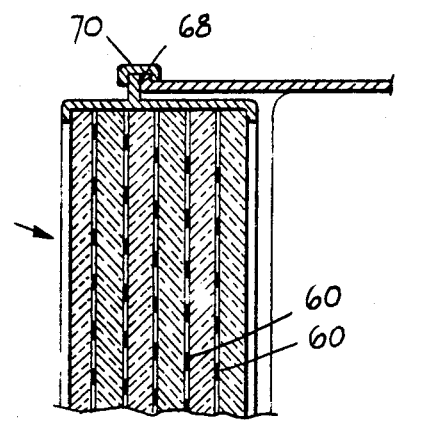
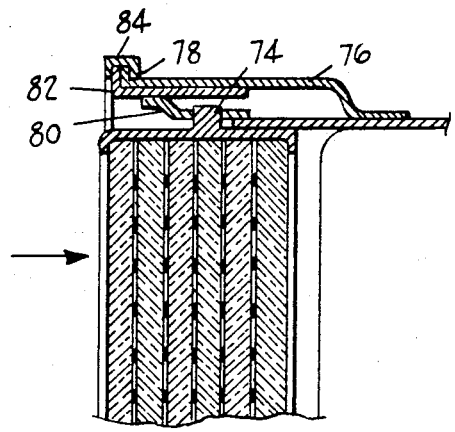
Fig. 9.
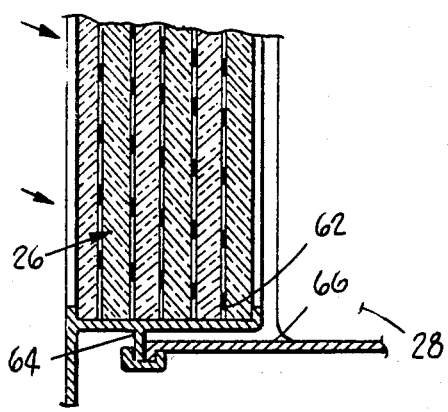
Fig. 8.
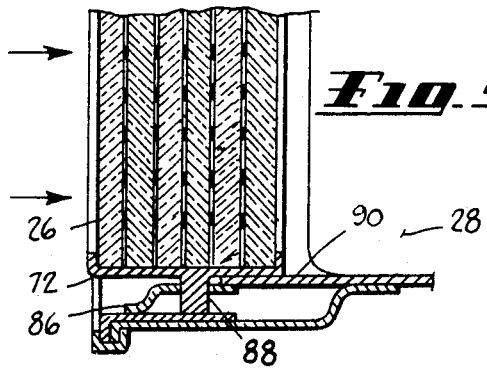
INVENTOR
VERN E. HAMILTON
BY Edwin Coates
- ATTORNEY -

May 12, 1970

V. E. HAMILTON 3,511,560

AMBIENT LIGHT FILTER

Filed Oct. 15, 1962

INVENTOR
VERN E. HAMILTON

Edwin Coates
-ATTORNEY-

United States Patent Office 3,511,560
Patented May 12, 1970

3,511,560
AMBIENT LIGHT FILTER
Vern E. Hamilton, Palos Verdes Estates, Calif., assignor, by mesne assignments, to McDonnell Douglas Corporation, Santa Monica, Calif., a corporation of Maryland
Continuation-in-part of application Ser. No. 138,855, Sept. 18, 1961. This application Oct. 15, 1962, Ser. No. 230,644
Int. Cl. G02b 27/00
U.S. Cl. 350—276       3 Claims This invention relates to a light ray filter for use primarily with a diffuse radiant screen presenting reproduced images, and is directed particularly to such filter which will trap ambient light rays angularly directed toward such screen. The filter traps both diffuse and concentrated light, thus preventing all angular reflections which degrade the image contrast, and consequently improving the quality of the image which is viewed. This application is a continuation-in-part of my application, Ser. No. 138,855, filed Sept. 18, 1961, now abandoned.

Cathode ray tubes, whether used for radar or laboratory work or for home television, are made in essentially the same way. The tube is made of glass and has a front, or viewing, face. On the inner side of this face is a coating of phosphors which are activated by electrons striking them from the rear of the tube to cause them to glow and give off diffuse light. They are, of course, activated selectively in response to input signals to produce images of many types, depending on the purpose, such as cloud patterns for weather radar, dots or pips for IFF instruments, various lines representing forces recorded in laboratory work, and photographic type pictures as in home television. Either the external glass face or the coating of phosphors may be considered as the "screen."

Ambient light rays striking the face of a cathode ray tube produce two problems. The more minor one is specular reflection off the first surface of the glass. In home television the majority of the specular reflection is off the first surface of the safety glass. In either case this problem can be reduced to a fairly satisfactory level by providing a low reflection or "non reflecting" coating on the glass.

The second, and considerably more serious, problem is that of the ambient light rays passing through the glass of the tube and striking the phosphors. In addition to being diffuse emitters of light they also act as diffuse reflectors. Consequently the ambient rays are reflected diffusely off all the phosphors whether or not they are being activated by electron discharges of the tube at the time. Since the ambient light, particularly on a bright day in an airplane at high altitude, is far greater than the light of the activated phosphors, the reflected ambient light may and frequently does completely hide or obliterate the signal. This results from the fact that the shadows, or low lights, are illuminated to such an extent that they cannot be distinguished from the signals, or high lights. The contrast is degraded and the image is confused, and in some cases completed lost.

Various devices have been proposed or tried in the past but they have all had drawbacks of some kind. One obvious solution is a hood extending from the screen to the viewer or operator barring all ambient light. In any case this is a clumsy expedient and in many cases it is completely unworkable, as in connection with a radar scope in an airplane. The pilot must be able to see all about him at a glance and this cannot be done with the hood blocking his view.

A variation of the hood scheme is a honeycomb structure, with relatively small cells, placed directly in front of the screen. In effect this is a multiplicity of small hoods or tunnels and is better because it projects only a short distance. However, even though the walls of the cells are blackened, the most harmful ambient rays strike them at grazing incidence and are absorbed only to a slight extent. The majority of the light energy will be reflected onward and into the tube and reflected off the phophors back to the viewer's station, thus degrading the contrast. In addition, the off-axis signal images will be reflected off the walls toward the viewer and produce spurious signal images when viewed under night conditions.

Another device which has been proposed and tried with various modifications is essentially a shield or panel placed in front of and generally parallel to the screen, the shield being transparent and bearing a network or grid of parallel black opaque lines either all in one direction or with one set angularly intersecting another set. Usually the grid is in the form of a mesh of threads or wires. Light rays striking these threads at a normal or nearly normal angle to the surface of the threads at the exact point of contact are largely absorbed. Those which strike at a grazing angle are reflected onward to the phosphors and then reflected back to the viewer. All of the rays which pass through the apertures strike the phosphors and are reflected back to the viewer. The net result is some small improvement when the ambient light is of low intensity. However, if the ambient light is at all high, as in high flying airplanes or in any airplanes on clear sunny days, the contrast will still be degraded to the point where the signal image cannot be distinguished.

The present invention solves the above described problem in a unique fashion by provision of a filter body including a panel of transparent material bearing a plurality of filter elements. Each of these elements is generally planar and consists in its preferred form of a film of light absorbing material having a multiplicity of apertures therethrough. The material of the film has a light absorption factor or coefficient of the order of .999, as near as possible to that of a black body radiator. The filter elements are carried by the panel in substantially parallel spaced relation, and the apertures in successive elements are directionally correlated to define a multiplicity of depthwise directed viewing cells. The axes of the majority of the cells are generally parallel to each other, although other arrangements are provided for special purposes as will be outlined later.

Light rays which strike the first, or outermost, film at nearly normal angles are absorbed. Those which strike it at a grazing angle are reflected at such a wide angle from normal that they do not bother the viewer. Those rays which enter the cells angularly are intercepted at a nearly normal angle by a succeeding film and very largely absorbed. The remaining light energy of the intercepted ray is successively reflected back and forth between adjacent films until it is completely absorbed and no light energy reaches the phosphors. Of course the on-axis and nearly-on-axis rays would pass through the cells to the phosphors and be reflected back, but the included angle of such rays is rather small and will be blocked largely by the viewer himself. In addition, in an airplane, the structure behind him will block an even larger angle. One of the essential features of the invention is that the films are so thin at the margins of the apertures that they present only a series of knife edges to the incident light so have no appreciable grazing wall to reflect any rays onward, either toward or away from the screen. The device acts in the same way to trap off-axis rays emanating from the screen and prevent them from being reflected onward to produce spurious signal images which would confuse the viewer especially at nitght when the viewer is in the dark adapted condition.

In its presently preferred form, the panel is made up of a plurality of layers of transparent material, such as cellulose tri-acetate, on each of which is printed, with black ink, a film of light absorbing material in the form of a grid with light transmitting apertures alternating with the light absorbing material. The ink must be a dye type rather than the pigmented type to produce an intense black which will have the high light absorption coefficient mentioned above. The pattern is usually identical on each layer. The layers are then juxtaposed with the apertures in perfect registry and are cemented together with a transparent cement having, as nearly as possible, the same index of refraction as the material of the layers. Thus the panel becomes essentially unitary and internal reflecting surfaces are eliminated. Since the lines of the grid pattern are spaced in a depthwise direction the entire assembly may be thought of as a series of louvered louvers.

Any pattern which is noticeable will distract the viewer and make it difficult to concentrate on the image which concerns him. The lateral dimension of the apertures in at least one direction is made so small that the apertures are substantially unresolvable at the normal or preselected viewing distance. The lines of light absorbing material are ordinarily much narrower than the apertures to transmit the maximum signal image light possible from the tube, and vary from one third to one seventh of the width of the aperture. A ratio of about one fifth has been found to give adequate light transmission and adequate ambient ray trapping in most instances, but a line width equal to the space width is useful in certain configurations.

The filter body itself may be modified in various ways to obtain special viewing results and it may also be adjustably mounted to accomplish other special purposes. These and other advantages and features of novelty will be pointed out or become apparent in the course of the detailed description of the invention in conjunction with the attached drawings, in which:

FIG. 7 is a partial elevational view in section illustrating one of the modified forms of the invention;

FIG. 8 is an elevational view, partially in section, illustrating another modified form of the invention;

FIG. 9 is a view similar to FIG. 8 but showing another form of the invention;

Figure 1:
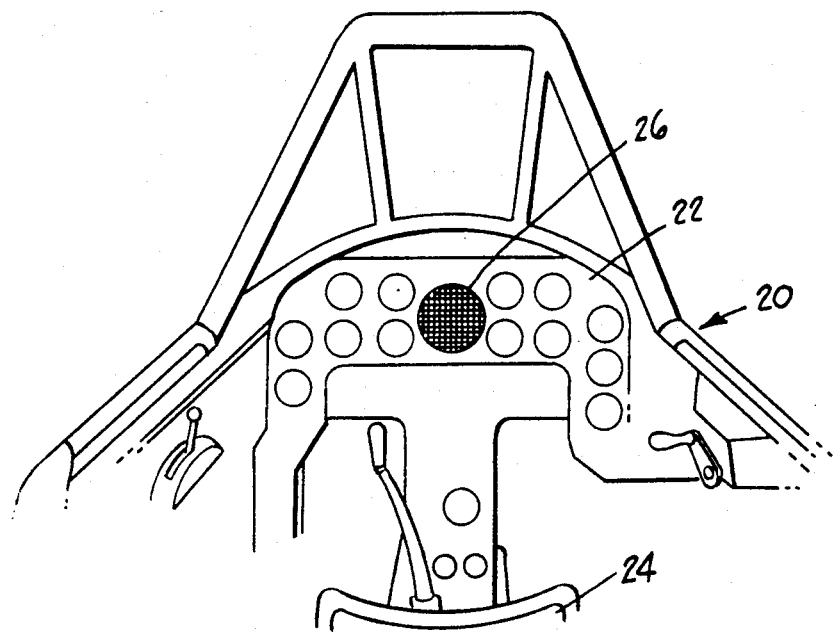
FIG. 1 is a partial perspective view of an airplane cockpit showing the novel filter in place in front of a radar scope.

The airplane cockpit 20, illustrated in FIG. 1, includes an instrument panel 22 and a pilot's seat 24 in alignment therewith. Centrally located in the panel is a radar scope, over the face of which is mounted the filter 26 of this invention. Since most of the cockpit is glazed, ambient light enters from substantially all directions to impinge on the face or screen of the cathode ray tube of the scope. This ambient light on a bright day is so much brighter than the strongest signal image that can be produced that its reflection off the phosphors eliminates all low lights and the screen appears to be a white blank. If the sun's rays strike it more or less directly the added specular reflection constitutes a further disadvantage. An optical filter which would reduce the impinging light would also reduce the signal light by nearly the same amount so that little would be gained by its use. The present filter traps off-axis light proceeding toward the screen while permitting on-axis light from the screen to pass on to the viewer.

Figure 2:
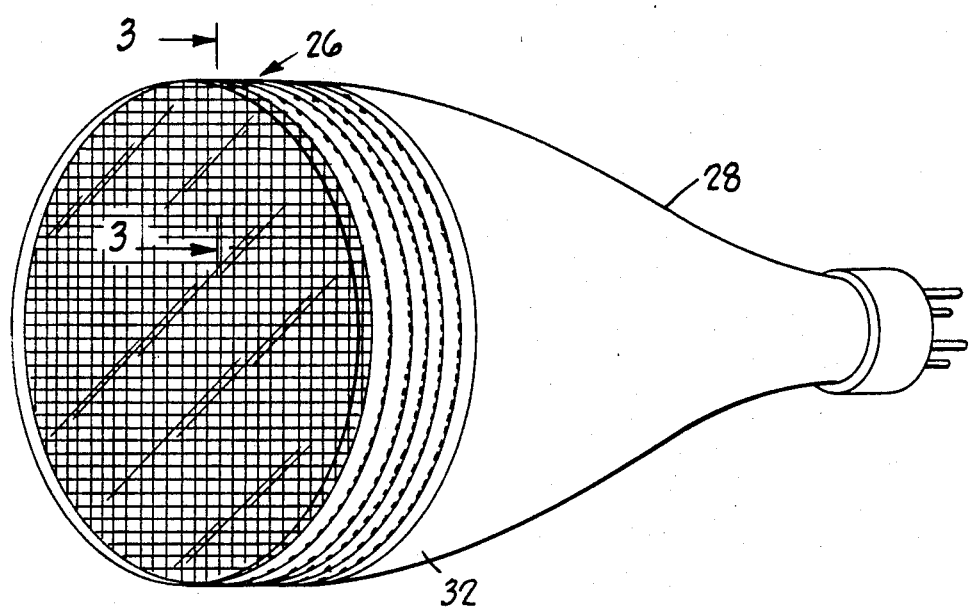
FIG. 2 is a perspective view of the novel filter located directly in front of a cathode ray tube.
Figure 3:
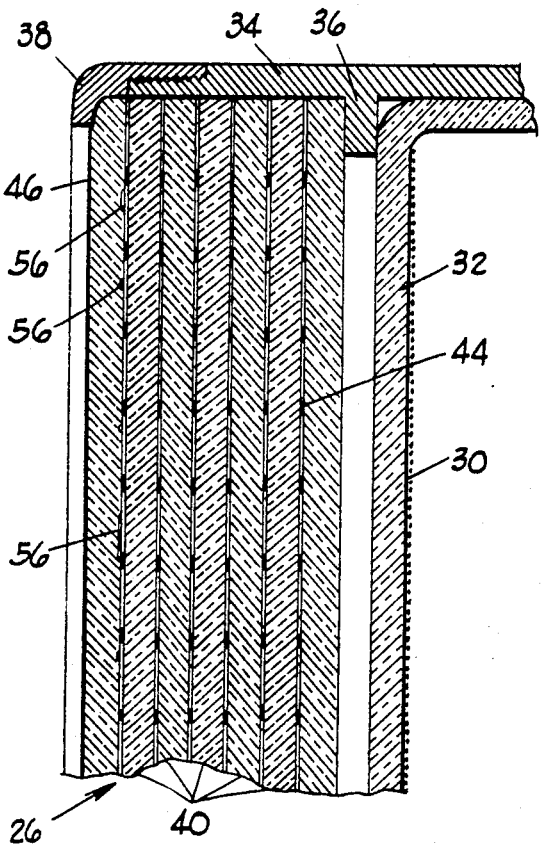
FIG. 3 is a sectional view taken on line 3—3 of FIG. 2.

A typical filter 26 is shown in FIG. 2 mounted directly in front of the cathode ray tube 28 so as to intercept ambient light rays angularly directed toward the screen 30 of the tube, FIG. 3, constituting the coating of phosphors on the internal surface of the face 32. In this and other figures the thickness of the filter and the dimensions of its elements are shown greatly exaggerated for clarity.

It will be seen in FIG. 3 that the filter is mounted to the tube by means of a sleeve 34 having an internal flange 36 and a flanged and threaded cap ring 38. The sleeve also serves to prevent ambient light from entering between the filter and the screen. The main filter body is made up, in its presently preferred form, of a plurality of layers 40 of a clear transparent plastic material such as cellulose tri-acetate. On each layer is formed a filter element consisting usually of a grid of crossed lines 42, 44, as illustrated diagrammatically in FIGS. 4 and 5. These lines are preferably straight and continuous, although other forms can be used for special purposes. The grid pattern is uniform on each layer and is printed thereon with black ink which is opaque and highly light absorbing. Ordinary pigmented inks, such as those using carbon particles, are unsatisfactory because the particles scatter and reflect the light rays and hence have a relatively low light absorption coefficient. It is necessary for the purposes of the present invention to use a dye type ink. A mixture of magenta and cyan dyes produces an intense black which has a light absorption coefficient of the order of .999, approaching that of a black body radiator. It can then be said that each grid is a film of maximum light absorbing material interrupted in a plurality of loci to form a multiplicity of light transmitting apertures.

Figure 13:
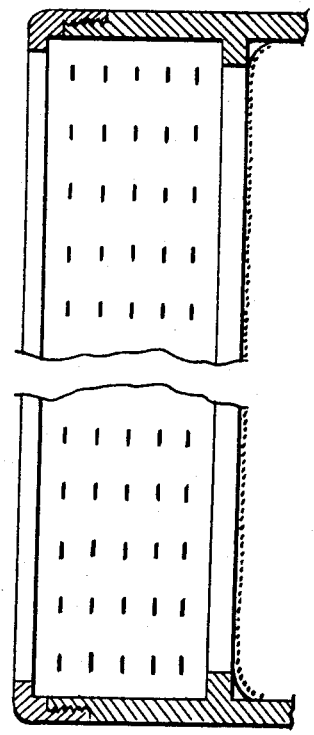
FIG. 13 is a view similar to FIGS. 3 and 7–10 in which the filter is shown as being optically homogeneous and having the filter elements embedded therein.

After the layers are printed they are indexed so that the apertures will be in perfect registry and they are then cemented together with a suitable transparent cement having, as nearly as possible, the same index of refraction as the material of the layers. This results in the construction shown in FIG. 3 with the layers now unitary or integral so that the internal reflecting surfaces are eliminated. This optically unitary or integral effect is depicted in FIG. 13 wherein the filter is shown as consisting of a single homogeneous thickness of transparent material with the filter element being embedded or suspended therein. Even though the assembly is in fact a laminated construction the optical characteristics of all laminae and of the cementitious bonding media are such that there are no apparent interfaces and effectively all laminae are fused together.

The lines can be formed in other ways, such as photographically. The deposited silver lines form a satisfactorily sharp grid pattern but the silver particles scatter and reflect the light rays to such an extent as to reduce the light absorption coefficient to a level too low to be suitable for the purposes of the invention. Therefore, after the film has been developed the silver deposit forming the grid lines is bleached out and replaced with a black dye, such as the mixture of magenta and cyan mentioned above, to produce an intense black having maximum light absorption.

Preferably a glass cover plate 46 is mounted in front of the filter body to protect it from scratches. It may be similarly cemented to eliminate all possible reflecting surfaces. Also it may be provided with a non-reflective coating to reduce specular reflection. The plate may also serve other purposes which will be detailed later.

Figure 4:
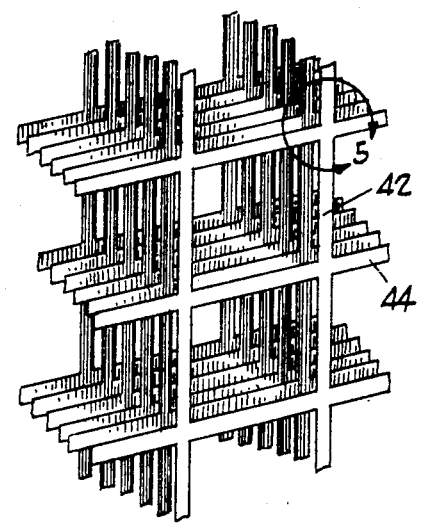
FIG. 4 is a diagrammatic view in perspective showing one form and arrangement of the light absorbing elements of the filter.
Figure 5:
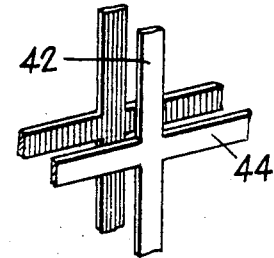
FIG. 5 is an enlarged perspective view of a portion of the structure shown in FIG. 4 and encircled by arrows 5.

It is apparent from FIGS. 3 and 4 that the plurality of films, with their apertures, depthwise spaced from each other define a multiplicity of depthwise directed viewing cells each bounded by portions of the light absorbing film in the manner of a series of louvered louvers or a light absorbing lattice. The axes of these cells in the form under consideration are generally parallel to each other and to the axis of the tube, or normal to the plane of the filter elements.

Figure 6:
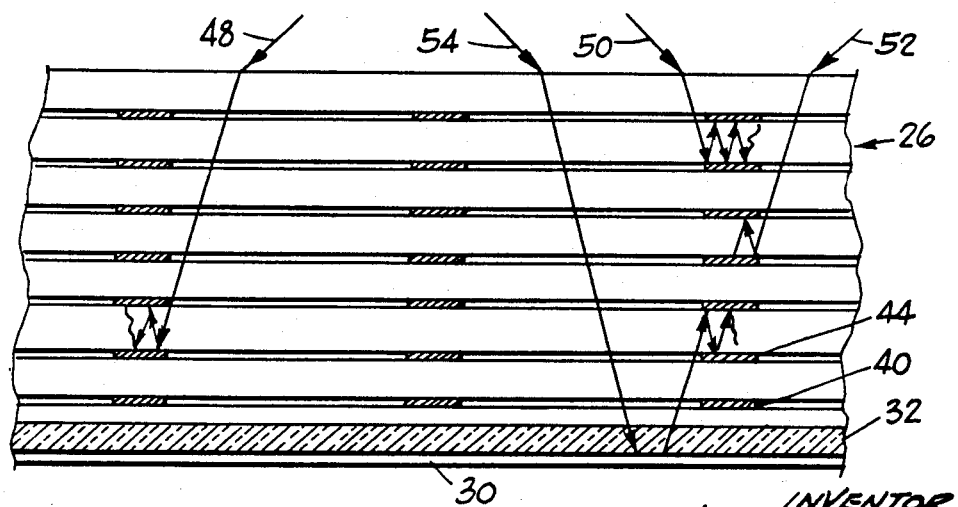
FIG. 6 is a diagrammatic view in the form of a vertical section illustrating the operation of the filter in trapping ambient light rays.

The manner in which the filter operates will best be understood by studying the diagrammatic illustration in FIG. 6. It will be seen that as angular rays 48, 50, 52 enter the filter body they are refracted more nearly normal to the plane of the filter body. Ray 50 is intercepted by the second film, ray 52 by the fourth and ray 48 by the fifth. In each case, the first black body struck absorbs most of the energy and reflects the ray back to the one adjacent which absorbs most of the remaining energy. The ray is successively reflected until all of its energy is absorbed. Normally those does not take more than two or three reflections, since the first surface absorbs substantially 99.9 percent of the energy and each succeeding surface absorbs the same proportion of the remaining energy. It will be noted that ray 54 has entered the cell at such point that it travels all the way to the screen without being intercepted. However, on its return path it is intercepted and absorbed as were the others. The diffuse off-axis radiations from the activated phosphors which normally tend to confuse the image are similarly trapped and absorbed.

If the lines 44 were very thick, as shown in the exaggerated view, their edges would have enough axial dimension to form grazing surfaces which would reflect many rays onward to the screen. In the same way, such surfaces would reflect off-axis rays from the screen onward toward the viewer and produce spurious signal images. When an observer is using a radar scope at night he becomes fully dark adapted, and a spurious image as bright as one percent of the primary image is completely intolerable because of the broad adaptability of the eye. The difficulty is overcome in the present invention by making the line thickness of the order of one or two ten thousandths of an inch, producing knife edges which for practical purposes present no grazing surface. The grid pattern, whatever form it takes, must be so fine that it is practically unresolvable by the eye at the pre-selected or normal viewing distance. In practice it is found that this can readily be accomplished with cell widths of approximately one sixty fourth inch. The pitch of the lines may vary from twenty per inch to one hundred per inch but a pitch of sixty per inch has been found satisfactory for all conditions encountered so far. This corresponds to the cell width mentioned above. The lines should be as narrow as possible and still accomplish their trapping function so that the maximum signal may be transmitted and viewed. The line width can be varied from one third to one seventh of the cell width but a ratio of about one fifth works best in a majority of cases.

It is also necessary to have a proper depthwise spacing between the filter elements to accomplish adequate entrapment of rays. A depthwise spacing of approximately one to two times the width of the lines has been very satisfactory. The depthwise spacing can be varied throughout the thickness of the filter to optimize the geometry and minimize the required number of layer elements. Thus the optimum arrangement is "trigonometric spacing" with the closest spacing adjacent the exposed surface of the filter body to reduce the heating of the body.

The number of layers or filter elements may be varied in accordance with the viewing problem. A single viewer, as the pilot of fighter aircraft, wants the maximum protection against ambient light and he looks from a substantially fixed eye point, requiring only a narrow angle of vision. His filter can have as high as twenty filter elements. Television viewing is broad angled and the lighting problem is not so serious, and room lights can usually be placed well off axis, so in this case the number of filter elements can be as low as two. For general use, such as on oscilloscopes in laboratories or elsewhere the best range is six to twelve filter elements. A six element filter body has a total thickness of about one sixteenth inch. For very large installations such as commercial moving picture screens, the element dimensions may be increased proportionally to the viewing distance to facilitate fabrication and registry of the filter assembly.

As indicated above, the filter is useful for any type of diffusely radiant screen whether it be a cathode ray tube, moving picture screen, or moving map or chart display of any kind. Contrary to expectations, even though the opaque or light absorbing portions obviously reduce the total light transmission from the screen by about thirty to fifty percent of the emission, the trapping of ambient rays increases the contrast so greatly that the picture actually appears to be much brighter. Thus it will be seen that the goal is not necessarily maximum transmission but rather optimum transmission.

Figure 11:
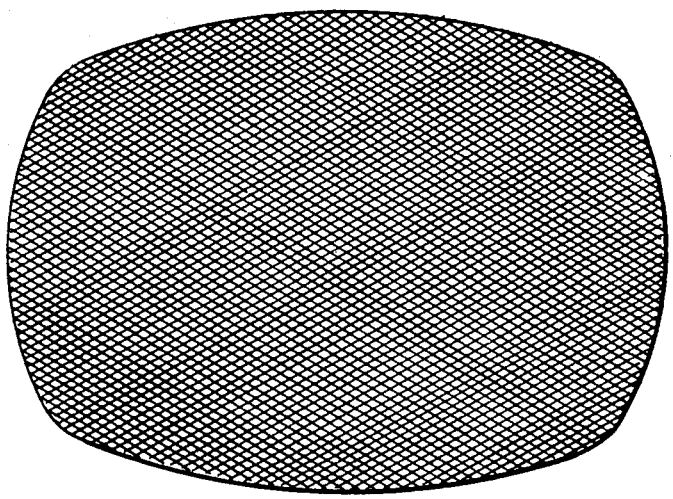
FIG. 11 is a front elevational view of the filter showing a diamond type grid pattern.
Figure 12:
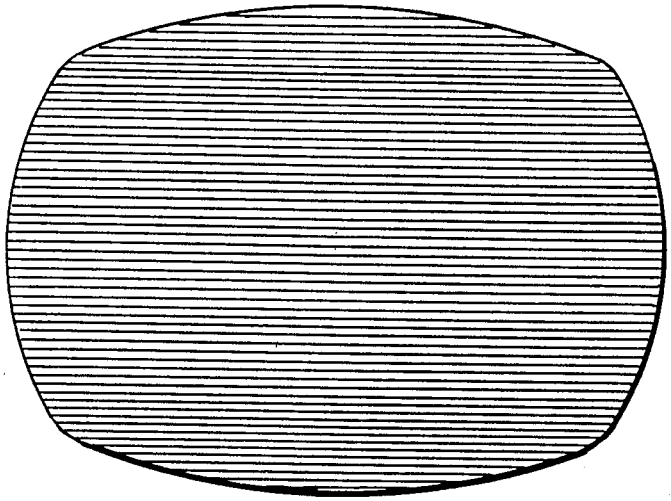
FIG. 12 is a front elevational view of a filter showing a parallel line type grid pattern.

The cell openings may have any desired shape but certain ones are more practical from the standpoint of manufacturing problems and they accomplish as much as any other known shapes. Crossed lines making square cells are very satisfactory. Where there is no raster, as in radar scopes and laboratory scopes, the lines may be vertical and horizontal. If a wider angle of vision is desired and the principal unwanted light comes from above or below the general viewing axis the square can be widened to a rectangle of suitable proportions. For tubes having a raster, such as home television, the squares should be set at an angle to avoid a moire effect, preferably 45° for uniformity. To obtain a wider viewing angle in thise case the angle of the lines can be reduced to as low as about ten or twenty degrees without producing a moire effect. This results in diamond shaped viewing cells having a width of the order of twice their height, as generally shown in FIG. 11. Also in some cases it is sufficient to use parallel lines extending in only one direction, as in FIG. 12. The direction would, of course, be selected with respect to the source of the most unwanted light, or other controlling factor. It should also be noted that any of the mentioned patterns which cross the raster lines of a home television set at a substantial angle or otherwise break them up will give the picture a halftone effect like a newspaper picture and substantially improve its appearance merely from this effect.

Another advantage of the filter of the present invention, when used in airplanes, appears in the course of night flying when the pilot must remain dark adapted in order to watch for objects outside the airplane and also, at a glance, read his instruments which are very dimly lighted in order not to light up the cockpit. The off-axis rays from the signal images produced on the cathode ray tube fan out in all directions and ordinarily light up the cockpit. The present filter traps these rays in the same way as external rays so that the only light emitted is a general cylinder extending toward the eyes of the pilot.

The filter is usually placed rather closely in front of the cathode ray tube and generally parallel to its face. When it is spaced from the tube any substantial distance it is usually necessary or desirable to surround the gap between them with a mask to prevent unfiltered rays from reaching the screen. In some installations the filter can be cemented directly to the face of the tube, thus avoiding any gap, but this is not ordinarily required.

As indicated above, the filter body is very thin, usually about one sixteenth inch and seldom more than one eighth inch. It can therefore be placed between the tube and a transparent reticle plate bearing reference indicia to be compared with lines or the like appearing on the screen without introducing any appreciable parallax error. In fact the reticle can be and preferably is the glass cover plate and can be cemented directly to the front layer of the filter body. This arrangement is shown in FIG. 3, where the glass cover plate 46 is the reticle, provided with markings 56 thereon. One of the advantages of this arrangement is that the filter, with its black or dark filter elements, provides a dark background for the indicia markings so that they can be read more easily in the daytime, and without interfering with their ordinarily good visibility at night. Hence there is no need to use self-luminous markings. Cover plate 46 may also be colored to serve as an optical filter where such is needed. The filter and the reticle can be used with any of the forms of the invention disclosed herein.

In one contemplated variation, as shown in FIG. 7, the apertures defined by the horizontal lines 58 and the vertical lines, not shown, are made slightly smaller and closer in each outwardly succeeding filter element to cause the viewing cells to converge at least to some extent toward the focal or viewing point. For a single viewer in a fixed position the signal transmission in the corners of the screen is somewhat improved. Another manner of accomplishing the same result is to fabricate the filter in the normal flat form using identical elements, and then form the entire filter in double curvature to converge the cells toward the normal eye point.

In another form of the invention, shown in FIG. 8, the vertical lines, not shown, in filter body 26 remain as before but the horizontal lines 60 are progressively stepped upward in successive filter elements so that the axes of the cells will all be angled upward toward the viewer's eyes where the scope is normally below his eye level, thus providing an upwardly angled general viewing axis, which can be considered as a line generally parallel to the axes of the cells through which one is viewing.

In any embodiment of the invention, but particularly those of FIGS. 8 and 9, the material of all the filter elements except the outermost one may be a dense transparent red, such as "Aviation Red" or "Instrumentation Red," which has a very high filter factor (of the order of .99) although somewhat less than that of the black material of the outermost filter element. This material has special utility in connection with the devices about to be described. Filter 26 in FIG. 8 is carried by a channel shaped support ring 62 having a medially located outwardly extending flange 64. A sleeve 66 is supported on the tube 28 in any suitable manner and carries at its outer free end an outwardly extending flange 68 of the same diameter as and abutting flange 64. These two flanges are held in frictional engagement by a channel-shaped snap ring 70. It will be seen that the filter body can be rotated about its own axis 180 degrees. The pilot will now be looking down through the red lines at the signal images which will of course appear to be red. This adjustment is used only at night when all of the surrounding area is quite dark. At this time the pilot's eyes are completely dark adapted and he can see signal images having as little as one thousandths of the luminosity required for daytime viewing. Hence the very faint images resulting from passage through the red lines can still be seen without difficulty. The outermost element is black to initially absorb a large percentage of the ambient light rays and also to provide a dark background for the signal images and the reticle markings in daytime use. The single black filter element does not create total opacity in depth and hence does not interfere with night viewing. The position shown in the figure must, of course, be used for day viewing. Sleeve 66 serves as a shield to prevent any ambient rays from reaching the screen directly.

The mechanism shown in FIG. 9 provides the functions of the FIG. 8 devices and other functions in addition. Filter body 26 in this case has its cell axes normal to the plane of the filter elements. Support ring 72 surrounds the filter body 26 and is provided with diametrically opposed bosses 74 serving as axles for rotation of the filter about a transverse axis. Sleeve 76 is attached to tube 28 by any suitable means and at its forward or outward end carries an outwardly extending annular flange 78. A second sleeve 80 fits slidingly within the first sleeve and at its outer end carries an outwardly extending flange 82 of the same diameter as flange 78. A channel shaped snap ring 84 surrounds both of said flanges and holds them in frictional engagement. Brackets 86 are attached to sleeve 80 at diametrically opposite points and are provided with apertures 88 to receive the bosses or axles 74 for rotation therein. The ends of the bosses press against sleeve 80 sufficiently to be held frictionally in adjusted position.

The assembly described above amounts to a gimbal mounting providing for universal adjustment of the filter in sleeve 76. When the boses 74 extend horizontally the general viewing axis can be tilted up to match the general line of sight of the pilot for day use. For night use, with the dense red filter elements, the filter can be tilted downwardly and the pilot can look at the signal images through the red lines. Thus the device can accomplish the same function as the FIG. 8 device. In addition, it serves a further useful purpose for day viewing. No matter where the sun is with respect to the airplane, because of the universal mounting the filter can be tilted to an angle where the brightest rays are trapped and the pilot can move his head sufficiently to adjust his line of sight to the general viewing axis. Since light might pass between the filter body and the supporting sleeves, a plastic or rubber-like sleeve 90 is provided to overlap the inner edge of the filter body and yieldingly engage it in tilted position to block direct access of ambient rays to the screen.

Figure 10:
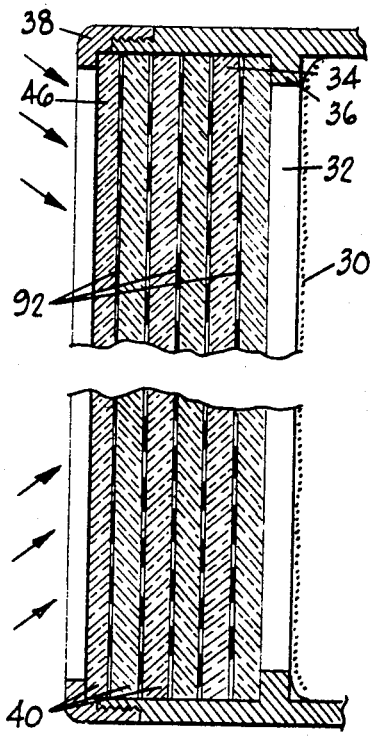
FIG. 10 is a plan view, partially in section, showing a further modified form of the invention.

The construction shown in FIG. 10 is the same as that in FIG. 3 except for the arrangement of the lines of the filter elements. In this plan view it will be seen that the vertical lines 92, 94 in successive filter elements are staggered in such fashion that two discrete general viewing axes are produced more or less at right angles to each other. This arrangement is for use in large airplanes where two pilots need to see a centrally mounted scope at the same time and cannot conveniently move their heads far enough to view the screen on its centerline. If the scope is below eye level the horizontal lines, not shown, can be graduated upward as in FIG. 8. Moreover the filter body of FIG. 10 in either form can be substituted for those of FIG. 8 and FIG. 9 with the attendant advantages.

It will be apparent that various changes and modifications may be made in the constructions disclosed without departing from the spirit of the invention and it is intended that all such changes and modifications shall be embraced within the scope of the following claims.

I claim:

1. The combination of a cathode ray tube and an ambient light trapping filter therefor; said tube having a front wall including an image screen of diffusely reflecting luminescent material depending on light-intensity contrast for ease in viewing thereof; said filter being mounted in front of and in proximity to the front wall of said tube and arranged to prevent impingement of reflection-producing light rays on said wall from directions other than those within the desired viewing angle; said filter comprising a thin, laterally extensive panel of transparent material bearing a plurality of filter elements; each of said filter elements comprising a generally planar tier of alternating loci of transparent and highly light absorbing material arranged to provide a multiplicity of light transmitting apertures in close proximity to each other and separated by light absorbing material to form a grid pattern; said tiers being separated from each other in a direction normal to their general planes, and said apertures in the successive tiers being arranged with respect to each other to present a multiplicity of light transmitting viewing cells extending depthwise of the panel; the light absorbing material adjacent each viewing cell serving to intercept at a nearly normal angle and absorb the energy of the ambient light rays angularly entering said cells; the lateral dimensions of the apertures and light absorbing material in at least one direction being so small that the grid pattern is substantially unresolvable at normal viewing distance; the width of the apertures being several times the width of the light absorbing material between apertures to obtain maximum light transmission from the image screen; and marginal means to prevent entry of lateral ambient light rays between the margin of said panel and the front wall of said cathode ray tube; the outermost tier comprising lines of intense black material having a light absorption factor approaching that of a black body radiator; and the inner tiers comprising lines of dense transparent red material to provide high visibility in daytime viewing conditions and to produce dark red signal images for good visibility in dark-adapted night viewing conditions.

2. The combination of a cathode ray tube and an ambient light trapping filter therefor; said tube having a front wall including an image screen of diffusely reflecting luminescent material depending on light-intensity contrast for ease in viewing thereof; said filter being mounted in front of and in proximity to the front wall of said tube and arranged to prevent impingement of reflection-producing light rays on said wall from directions other than those within the desired viewing angle; said filter comprising a thin, laterally extensive panel of transparent material bearing a plurality of filter elements; each of said filter elements comprising a generally planar tier of alternating loci of transparent and highly light absorbing material arranged to provide a multiplicity of light transmitting apertures in close proximity to each other and separated by light absorbing material to form a grid pattern; said tiers being separated from each other in a direction normal to their general planes, and said apertures in the successive tiers being arranged with respect to each other to present a multiplicity of light transmitting viewing cells extending depthwise of the panel; the light absorbing material adjacent each viewing cell serving to intercept at a nearly normal angle and absorb the energy of the ambient light rays angularly entering said cells; the lateral dimensions of the apertures and light absorbing material in at least one direction being so small that the grid pattern is substantially unresolvable at normal viewing distance; the width of the apertures being several times the width of the light absorbing material between apertures to obtain maximum light transmission from the image screen; and marginal means to prevent entry of lateral ambient light rays between the margin of said panel and the front wall of said cathode ray tube; and a transparent recticle member cemented to the outer face of said panel and bearing recticle marking thereon; said filter providing a dark background immediately adjacent to said marking to improve daytime visibility.

3. The combination of a cathode ray tube and an ambient light trapping filter therefor; said tube having a front wall including an image screen of diffusely reflecting luminescent material depending on light-intensity contrast for ease in viewing thereof; said filter being mounted in front of and in proximity to the front wall of said tube and arranged to prevent impingement of reflection-producing light rays on said wall from directions other than those within the desired viewing angle; said filter comprising a thin, laterally extensive panel of transparent material bearing a plurality of filter elements; each of said filter elements comprising a generally planar tier of alternating loci of transparent and highly light absorbing material arranged to provide a multiplicity of light transmitting apertures in close proximity to each other and separated by light absorbing material to form a grid pattern; said tiers being separated from each other in a direction normal to their general planes, and said apertures in the successive tiers being arranged with respect to each other to present a multiplicity of light transmitting viewing cells extending depthwise of the panel; the light absorbing material adjacent each viewing cell serving to intercept at a nearly normal angle and absorb the energy of the ambient light rays angularly entering said cells; the lateral dimensions of the apertures and light absorbing material in at least one direction being so small that the grid pattern is substantially unresolvable at normal viewing distance; the width of the apertures being several times the width of the light absorbing material between apertures to obtain maximum light transmission from the image screen; and marginal means to prevent entry of lateral ambient light rays between the margin of said panel and the front wall of said cathode ray tube; and means to movably mount the filter in front of the image screen to align the general viewing axis in various angular directions.

References Cited

UNITED STATES PATENTS

| | | |
|---|---|---|
| 2,536,310 | 1/1951 | Mayu. |
| 2,897,488 | 7/1959 | Rigney et al. |
| 3,037,419 | 6/1962 | Nixon. |
| 2,388,203 | 10/1945 | Zindel. |

OTHER REFERENCES

Minimizing the effects of Ambient Light on Image Production by Beers, Journal of the SMPTE, vol. 66; pp. 347–354, June 1957.

DAVID SCHONBERG, Primary Examiner

T. H. KUSMER, Assistant Examiner

U.S. Cl. X.R.

78—7.82